United States Patent
Kim et al.

(10) Patent No.: US 8,812,045 B2
(45) Date of Patent: Aug. 19, 2014

(54) METHOD FOR CONTROLLING TRANSMISSION POWER IN A MULTI-ANTENNA WIRELESS COMMUNICATION SYSTEM

(75) Inventors: Bong Hoe Kim, Anyang-si (KR); Byeong Woo Kang, Anyang-si (KR); Dae Won Lee, Anyang-si (KR); Yu Jin Noh, Anyang-si (KR); Ki Jun Kim, Anyang-si (KR); Joon Kul Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 13/202,703

(22) PCT Filed: Mar. 9, 2010

(86) PCT No.: PCT/KR2010/001459
§ 371 (c)(1),
(2), (4) Date: Aug. 22, 2011

(87) PCT Pub. No.: WO2010/104313
PCT Pub. Date: Sep. 16, 2010

(65) Prior Publication Data
US 2012/0008707 A1    Jan. 12, 2012

Related U.S. Application Data

(60) Provisional application No. 61/158,726, filed on Mar. 9, 2009.

(30) Foreign Application Priority Data

Mar. 9, 2010    (KR) .................. 10-2010-0020742

(51) Int. Cl.
*H04B 7/00*    (2006.01)
*H04B 1/04*    (2006.01)

(52) U.S. Cl.
USPC .......................................... 455/522; 455/125

(58) Field of Classification Search
CPC ..... H04W 52/146; H04W 52/24; Y02B 60/50
USPC ........... 455/102, 120, 125, 127.1–127.5, 522
See application file for complete search history.

(56) References Cited

U.S. PATENT DOCUMENTS 7,391,817 B2    6/2008    Lee
2003/0100329 A1*    5/2003    Kwon et al. .................. 455/522
(Continued)

FOREIGN PATENT DOCUMENTS

KR    2003-0087296 A    11/2003
KR    10-2004-0107787 A    12/2004
(Continued)

*Primary Examiner* — Yuwen Pan
*Assistant Examiner* — Xin Jia
(74) *Attorney, Agent, or Firm* — Birch, Stewart, Kolasch & Birch, LLP

(57) ABSTRACT

The present invention relates to a wireless access system, and more particularly, to a method for controlling uplink transmission power in consideration of a transmission rank in a multi-antenna environment. A method for controlling the transmission power of an uplink data channel at a transmitting end which supports a plurality of transmission ranks according to one embodiment of the present invention, comprises the steps of: determining a first transmission power using at least one rank variable dependent on the transmission rank in a specific subframe; comparing the determined first transmission power with a second transmission power which is the preset maximum transmission power; and determining the value judged to be smaller than the result of the comparison to be the transmission power of the data channel.

16 Claims, 6 Drawing Sheets

(56) References Cited

U.S. PATENT DOCUMENTS

| | | |
|---|---|---|
| 2004/0252797 A1 | 12/2004 | Lee et al. |
| 2005/0277419 A1* | 12/2005 | Takano et al. ................. 455/442 |
| 2008/0207150 A1* | 8/2008 | Malladi et al. ............. 455/127.1 |
| 2009/0252247 A1 | 10/2009 | Lee et al. |
| 2010/0165931 A1* | 7/2010 | Nimbalker et al. ........... 370/329 |

FOREIGN PATENT DOCUMENTS

| | | |
|---|---|---|
| KR | 10-0696208 B1 | 3/2007 |
| WO | 2009/023587 A2 | 2/2009 |

\* cited by examiner

METHOD FOR CONTROLLING TRANSMISSION POWER IN A MULTI-ANTENNA WIRELESS COMMUNICATION SYSTEM

This application is the National Phase of PCT/KR2010/001459 filed on Mar. 9, 2010, which claims priority under 35 U.S.C. 119(e) to U.S. Provisional Application No. 61/158,726 filed on Mar. 9, 2009, and under U.S.C. 119(a)-(d) to Patent Application No. 10-2010-0020742, filed on Mar. 9, 2010 in The Republic of Korea, which are hereby expressly incorporated by reference into the present application.

TECHNICAL FIELD

The present invention relates to a wireless access system, and more particularly, to a method for controlling uplink transmission power in consideration of a transmission rank in a multi-antenna environment, and an apparatus for performing the method.

BACKGROUND ART

According to the general technology, one transmitting antenna and one receiving antenna have been used. Multiple-Input Multiple-Output (MIMO) means a scheme that uses a plurality of transmitting antennas and a plurality of receiving antennas. Transmission and reception efficiency can be improved by the MIMO scheme. Namely, a transmitting end or receiving end of a wireless communication system can enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay node. According to the MIMO antenna technology, it is possible to overcome limitation of a transmission rate in mobile communication according to the related art where a single antenna is used.

A schematic view of a general MIMO communication system is illustrated in FIG. 1. Referring to FIG. 1, $N_T$ number of transmitting antennas are provided at a transmitting end while $N_R$ number of receiving antennas are provided at a receiving end. If a plurality of antennas are used at both the transmitting end and the receiving end, theoretical channel transmission capacity is more increased than that a plurality of antennas are used at any one of the transmitting end and the receiving end. Increase of the channel transmission capacity is proportional to the number of antennas. Accordingly, the transmission rate is improved, and frequency efficiency is also improved. Supposing that a maximum transmission rate is Ro when a single antenna is used, a transmission rate corresponding to a case where multiple antennas are used can be increased theoretically as much as a value obtained by multiplying a maximum transmission rate $R_o$ by a rate increase $R_i$.

For example, in a MIMO communication system that uses four transmitting antennas and four receiving antennas, a transmission rate four times greater than that of a single antenna system can be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

The MIMO antenna technology can be divided into a spatial diversity scheme and a spatial multiplexing scheme, wherein the spatial diversity scheme is to enhance transmission reliability using symbols which have passed through various channel paths, and the spatial multiplexing scheme is to increase a transmission rate by simultaneously transmitting a plurality of data symbols using a plurality of transmitting antennas. Also, a hybrid scheme of the above two schemes has been provided to appropriately obtain advantages of the two schemes.

In respect of the aforementioned MIMO technology, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate. In particular, a study of a method for efficiently controlling an uplink transmission power of a data channel in consideration of a transmission rank will be required.

DISCLOSURE

Technical Problem

Accordingly, the present invention has been devised to obviate one or more problems due to limitations and disadvantages of the related art, and an object of the present invention is to provide a method for controlling uplink transmission power in consideration of a transmission rank in a multi-antenna environment, and an apparatus for performing the method.

Another object of the present invention is to provide a method for efficiently controlling uplink transmission power in consideration of an uplink transmission rank in a multi-antenna environment, and an apparatus for performing the method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for controlling a transmission power of an uplink data channel at a transmitting end that supports a plurality of transmission ranks comprises the steps of determining a first transmission power using at least one rank variable dependent on the transmission rank in a specific subframe; comparing the determined first transmission power with a second transmission power which is the preset maximum transmission power; and determining the smaller value from the result of the comparison as the transmission power of the data channel.

At this time, the step of determining the first transmission power is performed additionally using at least one of a transmission path loss compensation parameter, a bandwidth of the data channel, a closed loop type power correction parameter, and a reference power determined by an upper layer.

Also, the rank variable is an offset value for power correction, which is set per rank.

Also, the offset value is determined through upper layer signaling or control channel.

Also, the rank variable is a parameter for power compensation through a modulation and coding scheme (MCS) for dynamic channel change.

Also, the parameter is determined using a value obtained by dividing a size of data transmitted from the subframe by the number of resource elements.

Preferably, the size of the data is a total sum of unit block sizes of the respective data transmitted from the subframe.

Preferably, each data unit block is a transport block or a code block.

In another aspect of the present invention, a user equipment that supports a plurality of transmission ranks comprises a processor; and a radio frequency (RF) module for transmitting and receiving a radio signal to and from the outside under the control of the processor, wherein the processor determines a first transmission power using at least one rank variable dependent on the transmission rank in a specific subframe, compares the determined first transmission power with a second transmission power which is the preset maximum transmission power, and determines the smaller value from the result of the comparison as the transmission power of the data channel.

At this time, the processor determines the first transmission power by additionally using at least one of a transmission path loss compensation parameter, a bandwidth of the data channel, a closed loop type power correction parameter, and a reference power determined by an upper layer.

Also, the rank variable is an offset value for power correction, which is set per rank.

Also, the offset value is preferably determined through upper layer signaling or control channel.

Preferably, the rank variable is a parameter for power compensation through a modulation and coding scheme (MCS) for dynamic channel change.

Preferably, the parameter is determined using a value obtained by dividing a size of data transmitted from the subframe by the number of resource elements.

Preferably, the size of the data is a total sum of unit block sizes of the respective data transmitted from the subframe.

Preferably, each data unit block is a transport block or a code block.

In the aforementioned embodiments, transmission of the data channel is preferably performed by a spatial multiplexing mode. Also, the reference power determined by the upper layer is determined by sum of a user equipment (UE)-specific value and a cell-specific value. Moreover, the uplink data channel is a physical uplink shared channel (PUSCH).

Advantageous Effects

According to the embodiments of the present invention, the following advantages can be obtained.

First of all, an uplink transmission power can be controlled efficiently in a multi-antenna environment through the embodiments of the present invention.

In addition, an uplink transmission power in a multi-antenna environment is determined in consideration of a rank, whereby the transmission power can be controlled more efficiently.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on that a mobile communication system is a 3GPP LTE system, the following description can be applied to another random mobile communication system excluding particular features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile terminal will refer to a mobile or fixed type user terminal device such as a user equipment (UE) and a mobile station (MS). Also, it is assumed that a base station will refer to a random node of a network terminal that performs communication with a mobile station, such as Node B (NB) and eNode B (eNB).

A peak power to average power ratio (PAPR) is a parameter representing properties of a waveform. This PAPR value is obtained by dividing peak amplitude of a waveform by a root mean square value of the waveform, and is a dimensionless value. Generally, a PAPR of a single carrier signal is better than that of a multi-carrier signal.

In the LTE-Advanced system, MIMO can be implemented using single carrier-frequency division multiple access (SC-FDMA) to maintain good cubic metric (CM) properties. If a general precoding is used, since signals carrying information corresponding to several layers are multiplexed and transmitted through one antenna, the signal transmitted through the above antenna can be regarded as a multi-carrier signal. The PAPR is associated with a dynamic range to be supported by a power amplifier at a transmitting end, and a cubic metric (CM) value is another value that can replace a value represented by the PAPR.

Figure 1:
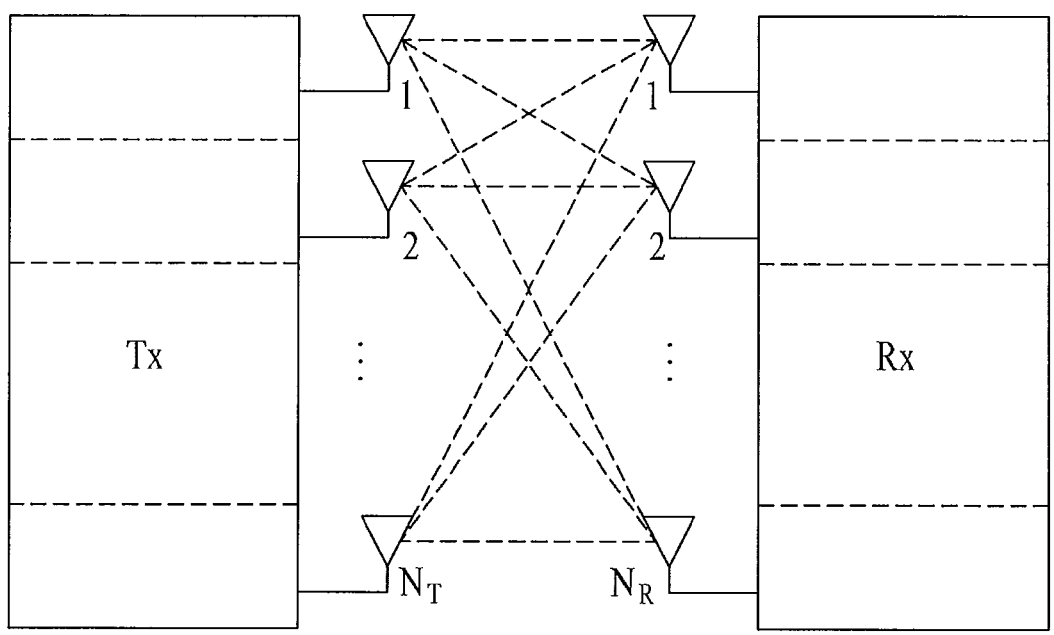
FIG. 1 is a schematic diagram illustrating a general MIMO communication system.

In order to describe a communication method in a MIMO antenna system in more detail, mathematical modeling can be expressed as follows. It is assumed that $N_T$ transmitting antennas and $N_R$ receiving antennas exist as illustrated in FIG. 1. In this case, a maximum rank $R_i$ of a channel matrix is given as expressed by Equation 1 below.

$$R_i = \min(N_T, N_R) \quad \text{[Equation 1]}$$

First of all, a transmitting signal will be described. If there exist $N_T$ transmitting antennas, since the number of maximum transmission information is $N_T$, the transmission information can be expressed by a vector shown in Equation 2 as follows.

$$s = [s_1, s_2, \ldots, s_{N_T}]^T \quad \text{[Equation 2]}$$

In the mean time, different kinds of transmission power can be applied to each of the transmission information $s_1$, $s_2, \ldots, s_{N_T}$. At this time, supposing that each transmission power is $P_1, P_2, \ldots, P_{N_T}$, transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ can be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the mean time, a weight matrix W is applied to the information vector $\hat{S}$ of which transmission power is controlled, whereby $N_T$ transmitting signals $x_1, x_2, \ldots, x_{N_T}$, which are actually transmitted, can be configured. In this case, the weight matrix serves to properly distribute the transmission information to each antenna depending on a transmission channel status. Such transmitting signals $x_1, x_2, \ldots, x_{N_T}$ can be expressed by Equation 5 below using a vector X.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

At this time, the signal vector x will be expressed as follows. In this case, $W_{ij}$ means a weight value of the jth information $\hat{S}_j$ transmitted through the ith transmitting antenna, and is expressed by a matrix W. W may be referred to as a weight matrix or precoding matrix.

In the mean time, the aforementioned transmission signal x can be considered by spatial diversity and spatial multiplexing.

In case of spatial multiplexing, since different signals are multiplexed and transmitted, elements of the information vector s have their respective values different from one another. On the other hand, in case of spatial diversity, since signals are transmitted through various channel paths, elements of the information vector s have the same values.

A hybrid method of spatial multiplexing and spatial diversity can be considered. In other words, same signals may be transmitted through some of transmitting antennas by using spatial diversity, and different signals may be transmitted through the other transmitting antennas by using spatial multiplexing.

If there exist $N_R$ receiving antennas, receiving signals $y_1$, $y_2, \ldots, y_{N_R}$ of the respective antennas can be expressed by a vector of Equation 6 below.

$$y = [y_1, y_2, \ldots, y_{N_R}]^T \quad \text{[Equation 6]}$$

In the mean time, in case of channel modeling in the MIMO communication system, channels can be classified depending on indexes of transmitting and receiving antennas. In this case, a channel between the jth transmitting antenna and the ith receiving antenna will be expressed as $h_{ij}$. In this case, it is noted that index of the receiving antenna is prior to index of the transmitting antenna in index of $h_{ij}$.

Several channels can be grouped into one and then can be expressed by a vector type or a matrix type. The channels of a vector type will be described below.

Figure 2:
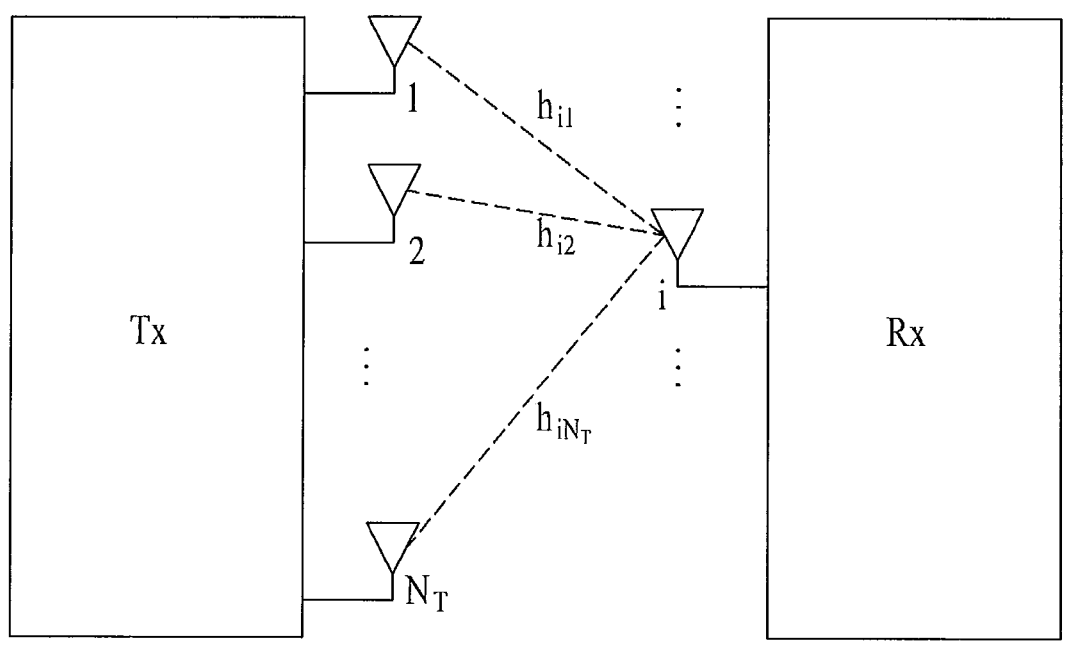
FIG. 2 is a diagram illustrating a channel from $N_T$ transmitting antennas to a receiving antenna i.

FIG. 2 is a diagram illustrating a channel from $N_T$ transmitting antennas to the ith receiving antenna.

As illustrated in FIG. 2, the channel from $N_T$ transmitting antennas to the ith receiving antenna can be expressed as follows.

$$h_i^T = [h_{i1}, h_{i2}, \ldots, h_{iN_T}] \quad \text{[Equation 7]}$$

Also, all channels from $N_T$ transmitting antennas to $N_R$ receiving antennas can be expressed by Equation 8 below through a matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

Since additive white Gaussian noise (AWGN) is actually added to the channels after the above channel matrix H, AWGN $n_1, n_2, \ldots, n_{N_R}$ added to each of the $N_R$ receiving antennas can be expressed by a vector of Equation 9 below.

$$n = [n_1, n_2, \ldots, n_{N_R}]^T$$ [Equation 9]

The receiving signals obtained using the above equations can be expressed by Equation 10 below.

$$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n = HWPs + n = \tilde{H}s + n$$

In the mean time, a concept of a codeword used in a MIMO communication system will be described below. In a general communication system, in order to correct an error of a channel at the receiving end, information transmitted to the transmitting end is coded using a forward error correction code and then transmitted to the transmitting end. The receiving end demodulates the received signal, decodes the error correction code, and recovers the transmission information. The error on the received signal, which is generated by the channel, is corrected through the decoding process as above.

A separate specific coding process is required for error detection separately from the error correction coding process. In this case, a cyclic redundancy check (CRC) code is widely used as the error detection code.

The CRC is one of coding methods used for error detection not error correction. It is general that transmission information is coded using CRC and then a forward error correction code is used for the CRC coded information. Generally, one unit coded by the CRC code and error correction code will be referred to as a "codeword".

In the mean time, the number of rows and columns of the channel matrix H indicating channel status is determined by the number of transmitting antennas and the number of receiving antennas. As described above, the number of rows in the channel matrix H is the same as the number $N_R$ of receiving antennas, and the number of columns is the same as the number $N_T$ of transmitting antennas. In other words, the channel matrix H can be expressed by $N_R \times N_T$ matrix.

Generally, a rank of the matrix is defined by a smaller number of the number of rows and the number of columns, which are independent from each other. Therefore, the rank of the matrix cannot have a value greater than the number of rows or the number of columns. Rank of the channel matrix H can be expressed by the following Equation 11.

$$\text{rank}(H) \leq \min(N_T, N_R)$$ [Equation 11]

Also, the rank may be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that can transmit different kinds of information from a given channel.

Different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that can transmit different kinds of information.

The channel matrix H can be expressed by the following Equation 12.

$$\text{\# of streams rank}(H) \leq \min(N_T, N_R)$$ [Equation 12]

In this case, "# of streams" represents the number of streams. In the mean time, it is to be noted that one stream can be transmitted through one or more antennas.

Various methods for corresponding one or more streams to several antennas can exist. These methods can be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme can exist.

Next, a relation between the codeword and the stream in the MIMO antenna communication system will be described.

Figure 3:
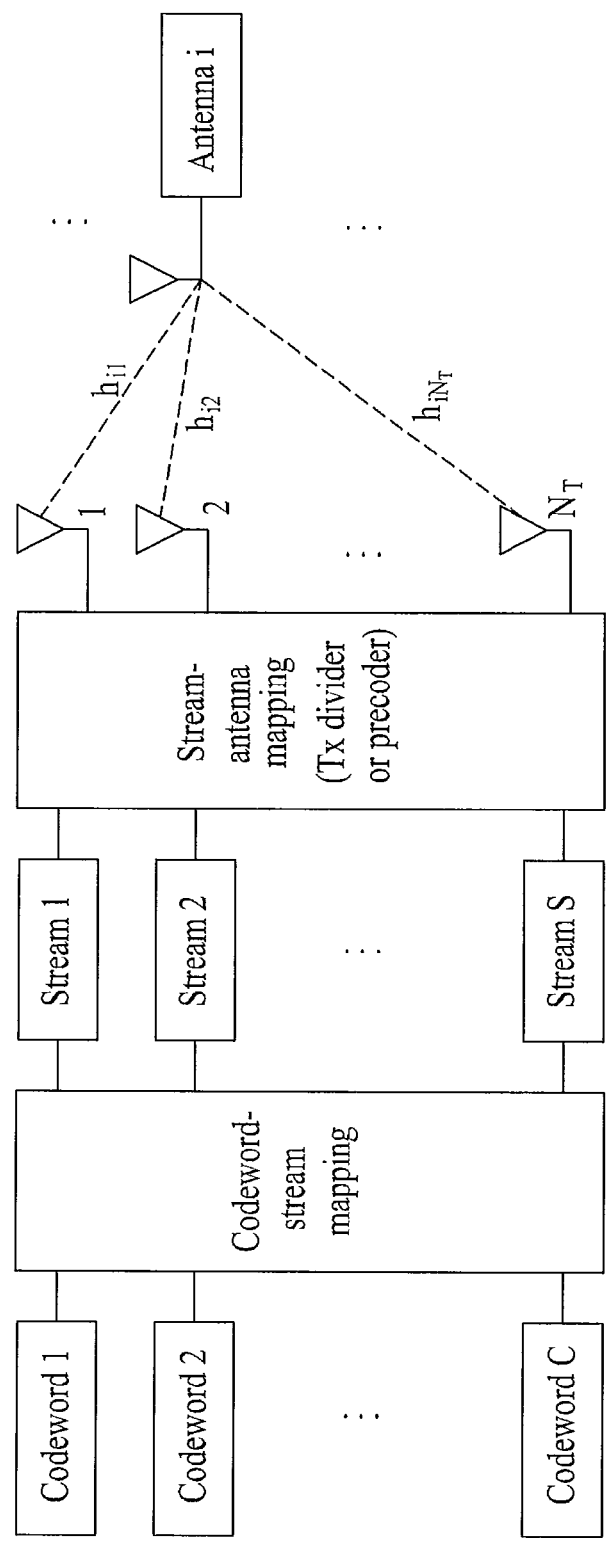
FIG. 3 and FIG. 4 are diagrams illustrating a relation among antenna, stream and codeword in a MIMO communication system.
Figure 4:
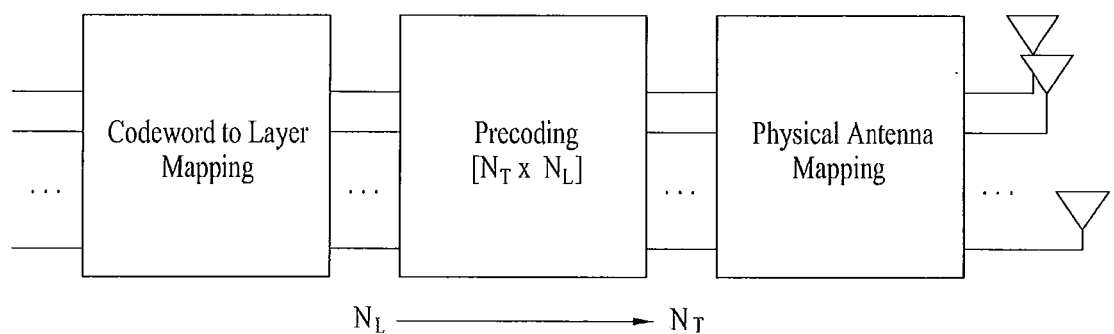

FIG. 3 and FIG. 4 are diagrams illustrating a relation among antenna, stream and codeword in a MIMO communication system.

Various methods for corresponding to a codeword to a stream can be provided. Referring to FIG. 3, codeword(s) is generated. The generated codeword is mapped into transport stream(s) by a "codeword-stream mapping module". Each stream is mapped into a transmitting antenna through a "stream-antenna mapping module".

In view of an ideal aspect, the codeword can freely be mapped into the stream. In other words, one codeword may be transmitted to several streams, or several codewords may be transmitted to one stream by contiguous combination. However, contiguous combination of several codewords in series can be regarded as a kind of coding. The embodiment of the present invention will be described based on that one codeword corresponds to one or more streams. However, it will be apparent to those skilled in the art that the present invention can be applied to all systems including features of the present invention.

Accordingly, it is assumed that one codeword corresponds to one more streams, in the following description unless any particular mention is made. Accordingly, if all kinds of information is transmitted through a coding process, the number of codewords and the number of streams satisfy Equation 13 below.

$$\text{\# of codewords} \leq \text{\# of streams}$$ [Equation 13]

In this case, "# of codewords" represents the number of codewords, and "# of streams" represents the number of streams.

Consequently, the Equation 11 to the Equation 13 can be expressed by Equation 14 below.

$$\text{\# of codewords} \leq \text{\# of streams} \leq \text{rank}(H) \leq \min(N_T, N_R) \quad \text{[Equation 14]}$$

The following facts can be noted from the above Equation 14. In other words, if there is limitation in the number of transmitting antennas and receiving antennas, there is also limitation in a maximum number of streams. Also, if there is limitation in the number of codewords, there is also limitation in a minimum number of streams.

In accordance with the aforementioned correlation between the codewords and the streams, if there is limitation in the number of antennas, there is also limitation in a maximum number of streams and codewords, whereby codeword-stream combination equivalent to the limited number of streams and codewords can be made.

In the mean time, in the mobile communication system, the user equipment can receive information from the base station through a downlink, and can transmit information through an uplink. Examples of information transmitted from or received in the user equipment include data and various kinds of control information. Various physical channels exist depending on a type and usage of the information transmitted from or received in the user equipment.

Figure 5:
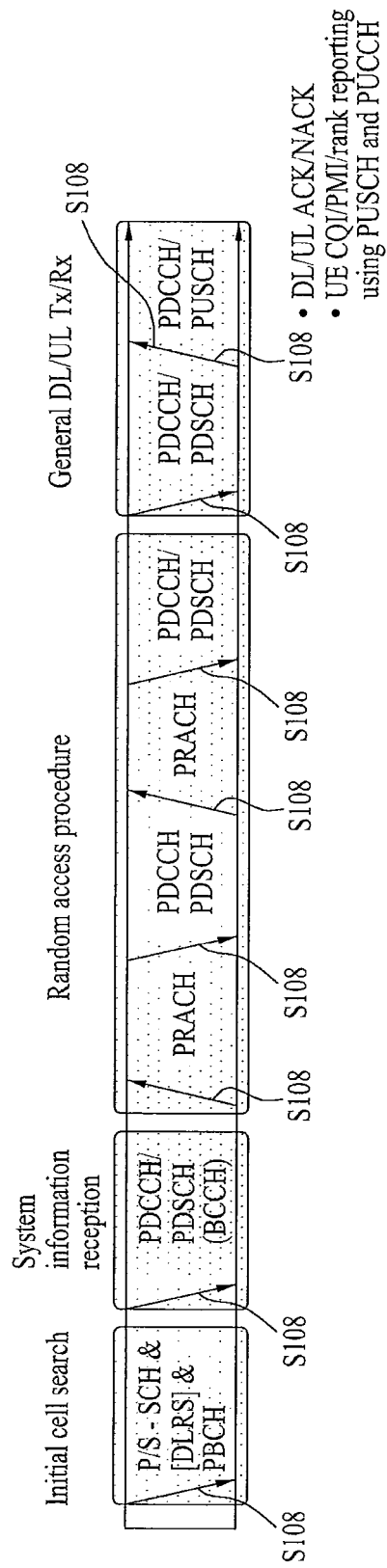
FIG. 5 is a diagram illustrating physical channels used in a 3GPP ($3^{rd}$ generation partnership project) system, which is an example of a mobile communication system, and a general method for transmitting a signal using the physical channel.

FIG. 5 is a diagram illustrating physical channels used in a 3GPP LTE system, which is an example of a mobile communication system, and a general method for transmitting a signal using the physical channels.

The user equipment performs initial cell search such as synchronizing with the base station when it newly enters a cell or the power is turned on (S101). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. In the mean time, the user equipment can identify the status of a downlink channel by receiving a downlink reference signal (DL RS) in the initial cell search step.

The user equipment which has finished the initial cell search can acquire more detailed system information by receiving a physical downlink control channel (PDCCH) and a physical downlink control channel (PDSCH) based on information carried in the PDCCH (S102).

In the mean time, if the user equipment initially accesses the base station, or if there is no radio resource for signal transmission, the user equipment performs a random access procedure for the base station (S103 to S106). To this end, the user equipment transmits a preamble of a specific sequence through a physical random access channel (PRACH) (S103), and receives a response message to the random access through the PDCCH and the PDSCH corresponding to the PDCCH (S104). In case of a contention based random access excluding handover, a contention resolution procedure, such as additional transmission of the physical random access channel (S105) and additional reception of the physical downlink control channel/physical downlink shared channel (S106), can be performed.

The user equipment which has performed the aforementioned steps receives the PDCCH/PDSCH (S107) and transmits a physical uplink shared channel (PUSCH) and a physical uplink control channel (PUCCH) (S108), as a general procedure of transmitting uplink/downlink signals. The control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

Hereinafter, a method for determining an uplink transmission power in a single antenna environment will be described. The method for determining an uplink transmission power, which will be described hereinafter, can be applied to various uplink channels. However, in this specification, it is assumed that the method is applied to a channel for transmitting data to an uplink, especially a physical uplink shared channel (PUSCH).

The following Equation 15 illustrates a method for determining a transmission power of a physical uplink shared channel in a general LTE system.

$$P_{PUSCH}(i) = \min\{P_{MAX}, 10\log_{10}(M_{PUSCH}(i)) + P_{O\_PUSCH}(j) + \alpha(j) \cdot PL + \Delta_{TF}(i) + f(i)\} \quad \text{[Equation 15]}$$

In the Equation 15, $P_{PUSCH}(i)$ represents a transmission power of the PUSCH at the ith subframe. $P_{MAX}$ represents a maximum uplink transmission power determined by an upper layer. Next, $M_{PUSCH}(i)$ represents a resource allocated to the ith subframe as a resource block (RB, group including a predetermined number of subcarriers).

A reference power determined by the upper layer $P_{O\_PUSCH}(j)$ can be configured by two parameters. One of the parameters is $P_{O\_NOMINAL\_PUSCH}(j)$ determined cell-specifically, and the other one of the parameters is $P_{O\_UE\_PUSCH}(j)$ determined user equipment-specifically. At this time, a value j of $P_{O\_UE\_PUSCH}(j)$ is set to 0 in case of general data transmission (PUSCH transmission based on dynamic PDCCH), set to 1 in case of semi-persistent PUSCH transmission, and set to 2 in case of random access data transmission (PUSCH transmission based on random access grant).

$\alpha(j)$ is a correction rate of path loss, and can be selected from $\{0, 0.4, 0.5, 0.6, 0.7, 0.8, 0.9, 1\}$. PL means path loss, and can be defined as "referenceSignalPower—higher layer filtered RSRP".

$\Delta_{TF}(i)$ represents a value that compensates for dynamic channel change through a modulation and coding scheme (MCS), and can be expressed by the following Equation 16.

$$\Delta_{TF}(i) = \begin{cases} 10\log_{10}(2^{MPR \cdot K_s} - 1), & K_s = 1.25, deltaMCS-\text{Enabled} = 1 \\ 0, & K_s = 0, deltaMCS-\text{Enabled} = 0 \end{cases} \quad \text{[Equation 16]}$$

Also, in the Equation 16, MPR can be expressed by the following Equation 17.

$$MPR = TBS/N_{RE}, N_{RE} = M_{PUSCH} \cdot N_{sc}^{RB} \cdot N_{symb}^{PUSCH} \quad \text{[Equation 17]}$$

In the Equation 16, Ks is a constant value which is experimentally determined. In the Equation 17, TBS represents a size of a transport block, and $N_{RE}$ represents the number of resource elements (REs) expressed by the number of subcarriers. If data are retransmitted, $N_{RE}$ is the same as a value indicated by an initial PDCCH for the same transport block (TB). Use of such $\Delta_{TF}(i)$ is set by a flag of deltaMCS-Enabled.

Finally, f(i) is a closed-loop type correction value, and can be controlled by a method for correcting a previous value in a decibel unit. A downlink control information (DCI) format of 0, 3 or 3 A can be used for f(i).

In the mean time, according to one embodiment of the present invention, the transmission power of the physical uplink shared channel in a single antenna environment may be determined by another method different from the aforementioned Equation 15.

This will be described with reference to Equation 18 below.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}$$ [Equation 18]

In the Equation 18, $P_{PUSCH})$ represents a transmission power of the PUSCH at the ith subframe. $P_{CMAX}$ represents a measured configured maximum UE output power. Next, $M_{PUSCH}(i)$ represents a bandwidth of PUSCH resource allocation, which is allocated to the ith subframe, as the number of resource blocks (RBs, group including a predetermined number of subcarriers).

A reference power determined by the upper layer $P_{O\_PUSCH}(j)$ can be configured by two parameters. One of the parameters is $P_{O\_NOMINAL\_PUSCH}(j)$ determined cell-specifically, and the other one of the parameters is $P_{O\_UE\_PUSCH}(j)$ determined user equipment-specifically. At this time, a value j of $P_{O\_UE\_PUSCH}(j)$ is set to 0 in case of general data transmission (PUSCH transmission based on dynamic PDCCH), set to 1 in case of semi-persistent PUSCH transmission, and set to 2 in case of random access data transmission (PUSCH transmission based on random access grant).

$\alpha(j)$ is a correction rate of path loss, and can represent any one of {0, 0.4, 0.5, 0.6, 0.7, 0.8, 0.9, 1} using 3 bits when j is 0 or 1. If j is 2, $\alpha(j)$ is 1.

PL is a downlink path loss prediction value of a decibel unit, which is calculated by the user equipment, and can be defined as "referenceSignalPower—higher layer filtered RSRP".

According to another aspect of this embodiment, $\Delta_{TF}(i)$ can be expressed by the following Equation 19.

$$\Delta_{TF}(i) = 10\log_{10}((2^{MPR \cdot K_S} - 1)\beta_{offset}^{PUSCH})$$ [Equation 19]

In the Equation 19, if deltaMCS-Enabled parameter is 1, $K_S = 1.25$ is given, and if deltaMCS-Enabled parameter is 0, $K_S = 0$ is given. Setting of the deltaMCS-Enabled parameter can be signaled by the upper layer.

In the Equation 19, MPR can be expressed by the following Equation 20.

$$MPR = \sum_{r=0}^{C-1} K_r/N_{RE}$$

(for control data sent via PUSCH without UL-SCH data, $MPR = O_{CQI}/N_{RE}$) [Equation 20]

Referring to the Equation 20, MPR is a value obtained by dividing the number of CQI bits including CRC bits by the number of resource elements if control information is transmitted through the PUSCH without uplink shared channel data. MPR can be determined as $$\sum_{r=0}^{C-1} K_r/N_{RE}$$

if not so.

In this case, the value C represents the number of code blocks, and $K_r$ represents a size of a code block r. Finally, in a general status, MPR is a value obtained by dividing the size of C code blocks by the number of resource elements (REs).

If control information is transmitted through the PUSCH without uplink shared channel data, $\beta_{offset}^{PUSCH} = \beta offset^{CQI}$ is set. In other cases, $\beta_{offset}^{PUSCH}$ is set to 1.

Finally, f(i) is a closed-loop type correction value, and can be controlled by a method for correcting a previous value in a decibel unit. A downlink control information (DCI) format of 0, 3 or 3 A can be used for f(i).

The methods for controlling an uplink transmission power have been described as above with reference to Equation 15 to Equation 20. However, since the aforementioned methods are applied to a single antenna environment, a method for controlling a transmission power in a MIMO environment that supports two or more antennas should be defined.

As described above, two transmission modes exist in the MIMO environment. In other words, one of the transmission modes is a transmit diversity mode, and the other one is a spatial multiplexing mode.

First of all, transmission power control of an uplink data channel in a transmit diversity mode will be described.

A method for controlling a transmission power of a data channel in a transmit diversity mode may be the same as the method for controlling a transmission power in a single antenna environment. Accordingly, the transmission power in the transmit diversity mode can be controlled in the same manner as the Equation 15 or the Equation 18. If this method for controlling a transmission power is applied to antenna group selection, a transmission power of an antenna group which is not selected becomes off-level, and a transmission power of an antenna group which is selected can be controlled in the same manner as the Equation 15 to the Equation 18.

Next, transmission power control of an uplink data channel in a spatial multiplexing mode will be described.

The method of the Equation 15 or the Equation 18 can also be applied to the method for controlling a transmission power in a spatial multiplexing. However, separate data may be transmitted to each of antennas in the spatial multiplexing mode.

Accordingly, the present invention suggests that a rank should be more considered in controlling a transmission power of an uplink data channel in a spatial multiplexing mode.

1. Case where "deltaMCS-Enabled" is not Set

In one aspect of this embodiment, if "deltaMCS-Enabled" is not set, that is, if $\Delta_{TF}(i)$ is set to 0, it is suggested that the Equation 15 should corrected to the following Equation 21.

The Equation 21 illustrates an example of a method for controlling a transmission power according to one embodiment of the present invention.

$$P_{PUSCH}(i) = \min\{P_{MAX}, 10\log_{10}(M_{PUSCH}(i)) + P_{O\_PUSCH}(j) + \alpha(j) \cdot PL + \Delta_{OFFSET}(i) + f(i)\}$$ [Equation 21]

In the Equation 21, $\Delta_{OFFSET}(i)$ may be a vale signaled through the PDCCH or the upper layer in consideration of a rank.

If the Equation 18 is corrected, $P_{MAX}$ of the Equation 21 may be replaced with $P_{CMAX}$.

2. Case where "deltaMCS-Enabled" is Set

In another aspect of this embodiment, if "deltaMCS-Enabled" is set, it is suggested that definition of $\Delta_{TF}(i)$ should be corrected.

Unlike a single antenna environment, a range of the value of the Equation 16 or the Equation 19 may become great depending on a transmission rank. Accordingly, another aspect of this embodiment suggests the following three methods as a method for controlling a transmission power in consideration of a transmission rank:

1) a method for re-defining $\Delta_{TF}(i)$ per rank;
2) a method for adding a rank-dependent correction term together with re-definition of $\Delta_{TF}(i)$; and
3) a method for re-defining one $\Delta_{TF}(i)$ that can universally be applied a multi-antenna environment.

First of all, a method for re-defining $\Delta_{TF}(i)$ per rank will be described.

Re-definition of $\Delta_{TF}(i)$ per rank means that a rank-dependent parameter is added to $\Delta_{TF}(i)$. In this case, the Equation 15 can be corrected to the following Equation 22.

The Equation 22 illustrates another example of a method for controlling a transmission power according to one embodiment of the present invention.

$$P_{PUSCH}(i) = \min\{P_{MAX}, 10\log_{10}(M_{PUSCH}(i)) + P_{O\_PUSCH}(j) + \alpha(j) \cdot PL + \Delta_{TF}^l(i) + f(i)\}$$ [Equation 22]

In the Equation 22, $\Delta_{TF}^l(i)$ means a value corresponding to a transmission rank 1 at the ith subframe. If the Equation 18 is corrected, P of the Equation 22 may be replaced with $P_{CMAX}$. Definition of MPR in $\Delta_{TF}^l(i)$ may be changed to a similar type (that is, transport block size is replaced with a full size of a code block) to that of the Equation 18.

Next, a method for adding a rank-dependent correction term together with re-definition of $\Delta_{TF}(i)$ will be described.

A method for controlling a transmission power in consideration of a rank-dependent correction term according to this embodiment can be expressed by the following Equation 23.

$$P_{PUSCH}(i) = \min\{P_{MAX}, 10\log_{10}(M_{PUSCH}(i)) + P_{O\_PUSCH}(j) + \alpha(j) \cdot PL + \Delta_{TF}(i) + \Delta_{OFFSET}(i) + f(i)\}$$ [Equation 23]

Referring to the Equation 13, $\Delta_{OFFSET}(i)$ is added from the Equation 15. The added $\Delta_{OFFSET}(i)$ is a transmission rank-dependent value of the ith subframe, and $\Delta_{TF}(i)$ can be set equally to or differently from $\Delta_{TF}^l(i)$ of the Equation 18, the Equation 16, the Equation 19, or the Equation 22. If the Equation 18 not the Equation 15 is corrected, P of the Equation 23 may be replaced with $P_{CMAX}$, and definition of MPR in $\Delta_{TF}(i)$ may be changed to a similar type (that is, transport block size is replaced with a full size of a code block) to that of the Equation 18.

In the mean time, $\Delta_{OFFSET}(i)$ can be signaled through the upper layer or control channel (for example, PDCCH). At this time, supposing that $\Delta_{TF}(i)$ is a value which is not varied depending on a rank as expressed by the Equation 15, $\Delta_{OFFSET}(i)$ requires much more transmission power. This is because that a data block corresponding to a high data transmission rate is transmitted as a rank is increased. Supposing that $\Delta_{TF}(i)$ is a value which is varied depending on a rank, a power variable range of $\Delta_{OFFSET}(i)$ is smaller than that $\Delta_{TF}(i)$ is varied depending on a rank. At this time, $\Delta_{OFFSET}(i)$ may be a constant value which is not varied depending on a rank.

Finally, a method for re-defining one $\Delta_{TF}(i)$ that can universally be applied a multi-antenna environment will be described.

In this case, the method for controlling a transmission power is similar to the Equation 15 or the Equation 18. However, it is preferable that $\Delta_{TF}(i)$ is varied to conform to the spatial multiplexing mode.

As another example of this embodiment, the Equation 15 or the Equation 18 is used as the method for controlling a transmission power if a rank is 1. For a rank more than 2, $\Delta_{TF}(i)$ can be set to 0. At this time, $\Delta_{TF}(i)$ applied to the rank 1 can differ from the Equation 16.

In more detail, if multiple transport blocks are supported by the spatial multiplexing mode, definition of MPR expressed by the Equation 17 can be varied to the following Equation 14.

$$MPR = \frac{\sum_k TBS_k}{N_{RE}}$$ [Equation 24]

In the Equation 14, $TBS_k$ represents a size of the kth transport block. In other words, MPR is a value obtained by dividing a size of all transport blocks by the number of resource elements. In the mean time, according to another aspect of the present invention, the transport block may be replaced with a code block in the Equation 24. In other words, MPR may be a value obtained by dividing a size of all code blocks by the number of resource elements.

If a retransmission status occurs without scheduling grant, the number of coded bits of control information can follow information (that is, resource allocation information) of initial PDCCH. Accordingly, definition of MPR may be the same as the Equation 17.

As a result, transmitting antennas of a small scaled user equipment can have gain of different transmitting antennas due to spatial limitation. This could cause performance degradation. In particular, if a signal to noise ratio (SNR) deviation is input to a channel decoder, performance of the channel decoder can be deteriorated by unequal antenna gain. This inequity can be observed as long-term channel characteristics at a receiving end. Accordingly, the present invention suggests a power offset value for correction of such unequal antenna gain through the aforementioned embodiments. Preferably, the power offset value is given through upper layer signaling.

User Equipment and Base Station

As other embodiment of the present invention, a user equipment (or mobile station (MS)) and a base station (or femto base station (FBS)) through which the embodiments of the present invention can be carried out will be described.

The user equipment is operated as a transmitting end in an uplink, whereas it is operated as a receiving end in a downlink. Also, the base station is operated as a receiving end in the uplink, whereas it is operated as a transmitting end in the downlink. In other words, each of the user equipment and the base station can include a transmitting end and a receiving end for transmission and reception of information or data.

The transmitting end and the receiving end can include a processor, a module, a part, and/or a means, for which the embodiments of the present invention are carried out. In particular, the transmitting end and the receiving end can include a module (means) for encoding messages, a module for decoding the encoded messages, and an antenna for transmitting and receiving messages. An example of the transmitting end and the receiving end will be described with reference to FIG. 6.

Figure 6:
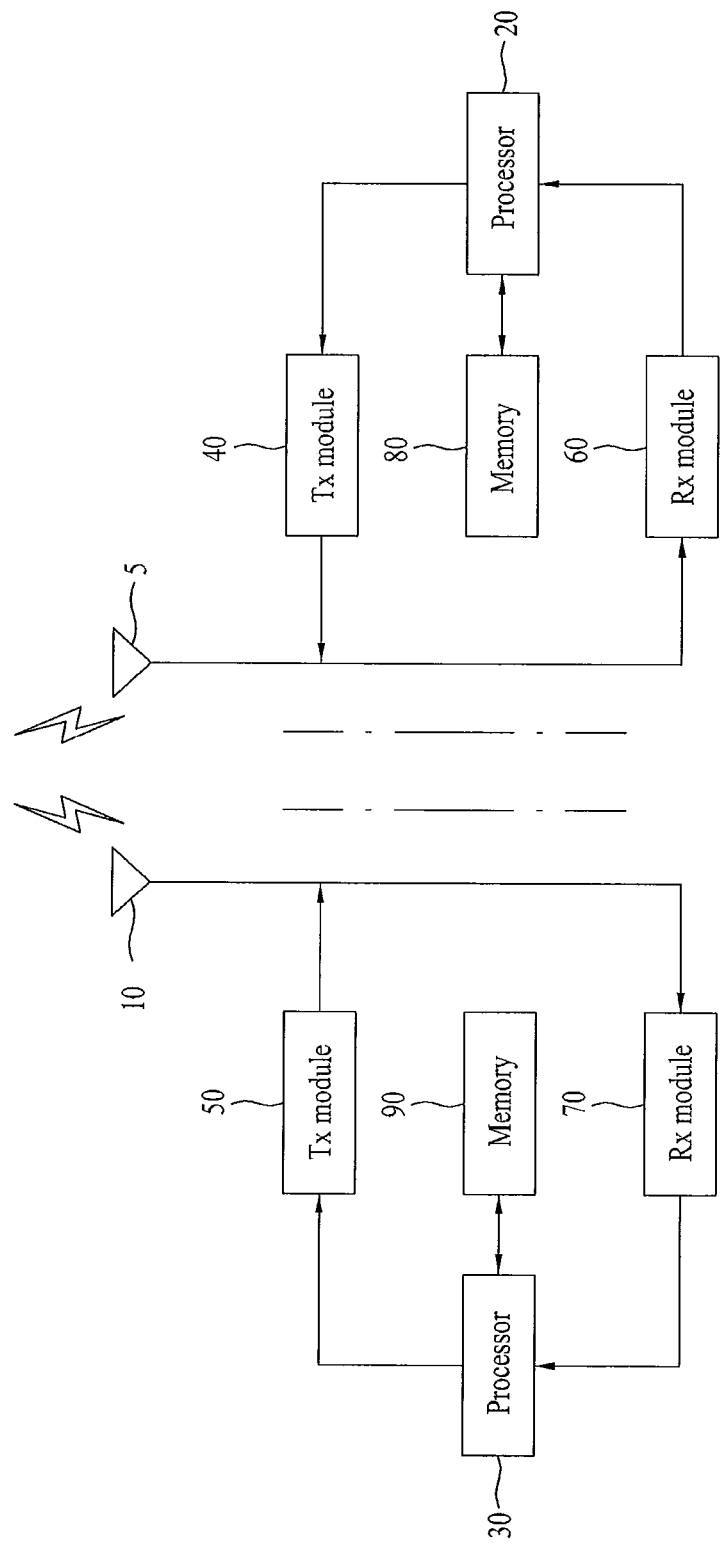
FIG. 6 is a block diagram illustrating an example of a structure of a transmitting end and a receiving end according to another embodiment of the present invention.

FIG. 6 is a block diagram illustrating an example of a transmitting end and a receiving end in accordance with other embodiment of the present invention.

Referring to FIG. 6, the left side represents a structure of the transmitting end while the right side represents a structure of the receiving end. Each of the transmitting end and the receiving end can include an antenna 5, 10, a processor 20, 30, a Tx module 40, 50, an Rx module 60, 70, and a memory 80, 90. The respective elements can perform functions corresponding to those of counterparts. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70. If a MIMO function is supported, two or more antennas may be provided.

The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc. In more detail, the processor 20, 30 can control the whole operation for the aforementioned transmission power control.

For example, the processor of the user equipment can determine the uplink transmission power of the data channel by using the Equation 15 to the Equation 24. In particular, the processor can determine the transmission power of the uplink data channel in consideration of the transmission rank in the spatial multiplexing mode of the MIMO mode. The processor can control the Tx module to apply the determined transmission power to transmission of the uplink data channel. In addition, the processor of the user equipment can control the whole operation of the procedure disclosed in the aforementioned embodiments.

The Tx module 40, 50 performs predetermined coding and modulation for data, which are scheduled from the processor 20, 30 and then transmitted to the outside, and then transfers the coded and modulated data to the antenna 10. In particular, the Tx module of the user equipment can include a codeword-stream mapping module mapping one or more codewords into one or more streams and a stream-antenna mapping module mapping one or more streams output from the codeword-stream mapping module into a plurality of antennas.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (sleep mode information based on reference synchronization information, etc.) Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the mean time, the base station can perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or further include a separate means, module, or part for performing the aforementioned functions.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention can be applied to various wireless access systems. Examples of various wireless access systems include 3GPP ($3^{rd}$ generation partnership project), 3GPP2 and/or IEEE 802.xx (Institute of electrical and electronic engineers 802) system. The embodiments of the present invention can be applied to all the technical fields based on the various wireless access systems as well as the various wireless access systems.

The invention claimed is:

1. A method for controlling a transmission power of an uplink data channel at a transmitting end that supports a plurality of transmission ranks, the method comprising the steps of:

determining a first transmission power using at least one rank variable dependent on the transmission rank in a specific subframe;

comparing the determined first transmission power with a second transmission power which is the preset maximum transmission power; and determining the smaller value from the result of the comparison as the transmission power of the data channel, wherein the at least one rank variable includes a parameter ($\Delta TF$) for power compensation through a modulation and coding scheme (MCS) for dynamic channel change and includes an offset value ($\Delta OFFSET$) for power correction which is set per rank, wherein a power variable range of the offset value ($\Delta OFFSET$) is smaller than a power variable range of the parameter ($\Delta TF$), wherein the parameter ($\Delta TF$) is determined by equations:

$$\Delta_{TF}(i) = 10\log_{10}((2^{MPR \cdot K_s} - 1)\beta_{offset}^{PUSCH}) \text{ and}$$

$$MPR = \frac{\sum_k TBS_k}{N_{RE}},$$

wherein $TBS_k$ represents a size of a k-th transport block, $N_{RE}$ is a number of resource elements (REs), and Ks is a constant value which is experimentally determined, and wherein if control information is transmitted through a physical uplink shared channel (PUSCH) without uplink shared channel data, $\beta_{offset}^{PUSCH} = \beta_{offset}^{CQI}$, otherwise $\beta_{offset}^{PUSCH}$ is set to 1.

2. The method according to claim 1, wherein the step of determining the first transmission power is performed additionally using at least one of a transmission path loss compensation parameter, a bandwidth of the data channel, a closed loop type power correction parameter, and a reference power determined by an upper layer.

3. The method according to claim 2, wherein the offset value (ΔOFFSET) is determined through upper layer signaling or a control channel.

4. The method according to claim 2, wherein the parameter (ΔTF) is determined using a value obtained by dividing a size of data transmitted from the subframe by the number of resource elements (REs).

5. The method according to claim 4, wherein the size of the data is a total sum of unit block sizes of the respective data transmitted from the subframe.

6. The method according to claim 5, wherein each data unit block is a transport block or a code block.

7. The method according to claim 2, wherein transmission of the data channel is performed by a spatial multiplexing mode.

8. The method according to claim 2, wherein the reference power determined by the upper layer is determined by a sum of a user equipment (UE)-specific value and a cell-specific value.

9. The method according to claim 2, wherein the uplink data channel is a physical uplink shared channel (PUSCH).

10. A user equipment that supports a plurality of transmission ranks, the user equipment comprising:
a processor; and
a radio frequency (RF) module configured to transceive a radio signal externally under the control of the processor,
wherein the processor is configured to determine a first transmission power using at least one rank variable dependent on the transmission rank in a specific subframe, compare the determined first transmission power with a second transmission power which is the preset maximum transmission power, and determine the smaller value from the result of the comparison as the transmission power of the data channel,
wherein the at least one rank variable includes a parameter for power compensation through a modulation and coding scheme (MCS) for dynamic channel change, and includes an offset value (ΔOFFSET) for power correction which is set per rank, and
wherein a power variable range of the offset value (ΔOFFSET) is smaller than a power variable range of the parameter (ΔTF),
wherein the parameter (ΔTF) is determined by equations:

$$\Delta_{TF}(i) = 10\log_{10}((2^{MPR \cdot K_s} - 1)\beta_{offset}^{PUSCH}) \text{ and}$$

$$MPR = \frac{\sum_k TBS_k}{N_{RE}},$$

wherein $TBS_k$ represents a size of a k-th transort block $N_{RF}$ is a number of resource elements (REs), and Ks is a constant value which is experimentally determined, and wherein if control information is transmitted through a physical uplink shared channel (PUSCH) without uplink shared channel data, $\beta_{offset}^{PUSCH}=\beta_{offset}^{CQI}$, otherwise $\beta_{offset}^{PUSCH}$ is set to 1.

11. The user equipment according to claim 10, wherein the processor is further configured to determine the first transmission power by additionally using at least one of a transmission path loss compensation parameter, a bandwidth of the data channel, a closed loop type power correction parameter, and a reference power determined by an upper layer.

12. The user equipment according to claim 11, wherein the offset value (ΔOFFSET) is determined through upper layer signaling or a control channel.

13. The user equipment according to claim 12, wherein the parameter (ΔTF) is determined using a value obtained by dividing a size of data transmitted from the subframe by the number of resource elements.

14. The user equipment according to claim 13, wherein the size of the data is a total sum of unit block sizes of the respective data transmitted from the subframe.

15. The user equipment according to claim 14, wherein each data unit block is a transport block or a code block.

16. The user equipment according to claim 11, wherein transmission of the data channel is performed by a spatial multiplexing mode.

* * * * *

UNITED STATES PATENT AND TRADEMARK OFFICE
CERTIFICATE OF CORRECTION

| | | |
|---|---|---|
| PATENT NO. | : 8,812,045 B2 | Page 1 of 1 |
| APPLICATION NO. | : 13/202703 | |
| DATED | : August 19, 2014 | |
| INVENTOR(S) | : Bong Hoe Kim et al. | |

It is certified that error appears in the above-identified patent and that said Letters Patent is hereby corrected as shown below:

ON THE TITLE PAGE:

At item (75), Inventors, change "Joon Kul Ahn, Anyang-si (KR)" to --Joon Kui Ahn, Anyang-si (KR)--.

Signed and Sealed this
Sixth Day of January, 2015

Michelle K. Lee
*Deputy Director of the United States Patent and Trademark Office*